United States Patent
d'Auria et al.

(10) Patent No.: US 6,172,802 B1
(45) Date of Patent: Jan. 9, 2001

(54) BIDIRECTIONAL OPTICAL AMPLIFICATION SYSTEM

(75) Inventors: Luigi d'Auria, Sceaux; Dominique Mongardien, Antony; Philippe Richin, Roinville sous Dourdan, all of (FR)

(73) Assignee: Thomson-CSF, Paris (FR)

(*) Notice: Under 35 U.S.C. 154(b), the term of this patent shall be extended for 0 days.

(21) Appl. No.: 09/147,685
(22) PCT Filed: Jun. 19, 1998
(86) PCT No.: PCT/FR98/01293
§ 371 Date: Feb. 16, 1999
§ 102(e) Date: Feb. 16, 1999
(87) PCT Pub. No.: WO98/59398
PCT Pub. Date: Dec. 30, 1998

(30) Foreign Application Priority Data

Jun. 20, 1997 (FR) .................................. 97 07708

(51) Int. Cl.[7] ............................................. H01S 3/00
(52) U.S. Cl. ........................................ 359/341; 359/124
(58) Field of Search .................................. 359/341, 124

(56) References Cited

U.S. PATENT DOCUMENTS

| 3,953,727 | 4/1976 | D'Auria et al. . | |
|---|---|---|---|
| 3,977,764 | 8/1976 | D'Auria et al. . | |
| 4,193,661 | 3/1980 | D'Auria et al. . | |
| 4,303,300 | 12/1981 | Pressiat et al. . | |
| 4,529,986 | 7/1985 | D'Auria et al. . | |
| 5,452,124 | * 9/1995 | Baker | 359/341 |
| 5,740,289 | * 4/1998 | Glance | 385/24 |
| 5,748,363 | * 5/1998 | Duck et al. | 359/341 |
| 5,801,879 | * 9/1998 | Burton et al. | 359/341 |
| 5,995,259 | * 11/1999 | Meli et al. | 359/134 |

* cited by examiner

Primary Examiner—Mark Hellner
(74) Attorney, Agent, or Firm—Oblon, Spivak, McClelland, Maier & Neustadt, P.C.

(57) ABSTRACT

A bidirectional optical amplification system which includes an optical amplifier having an input and an output and configured to amplify wavelengths lying within a range of wavelengths and an optical coupling device. The optical coupling device includes a first port configured to receive a first optical wave in a first subrange of wavelengths lying within a range of wavelengths, a second port configured to receive a second optical wave in a second subrange of wavelengths lying within the range of wavelengths, an optical coupling output coupled to the input of the optical amplifier, and an optical coupling input coupled to the output of the optical amplifier. The optical coupling device directs the first optical wave from the first port to the optical coupling output, directs an amplified optical wave, resulting from amplification of the first optical wave, from the optical coupling input to the second port, directs the second optical wave from the second port to the optical coupling output, and directs an amplified optical wave, resulting from amplification of the second optical wave, from the optical coupling input to the first port.

6 Claims, 6 Drawing Sheets

BIDIRECTIONAL OPTICAL AMPLIFICATION SYSTEM

BACKGROUND OF THE INVENTION

1. Field of the Invention

The invention relates to a bidirectional optical amplification system and in particular to a system making it possible, via one and the same optical guide, to transmit optical waves in both directions and to amplify them.

This system applies in particular to transmission on single-mode optical fibres using amplifiers having doped fibre. It allows an intrinsically monodirectional optical amplifier to be made into a bidirectional amplifier. Any existing monodirectional optical transmission can thus be transformed simply, rapidly and cheaply into a multichannel bidirectional transmission.

The device employs existing technologies; it is monobloc and easily insertable, by simple disconnection and reconnection of the optical amplifiers, into an optical transmission.

The areas of application are mainly telecommunications and fibre-optic distribution networks.

2. Discussion of the Background

Fibre-optic transmissions are making ever greater use of optical amplifiers having doped fibre in replacement of the repeaters used formerly and of wavelength multiplexing to multiply the number of channels which can be conveyed within one and the same fibre (see French patent No. 2 258 751).

FIGS. 1 and 2 show the optical transmission diagrams currently used in the areas of telecommunications and distribution networks.

Transmissions in the reverse direction are customarily carried out by twinning the transmission lines.

The optical amplifiers having doped fibre which are ordinarily used, such as the one represented in FIG. 3, are monodirectional on account of their design and of the presence of optical isolators; hence, they do not make it possible to carry out bidirectional transmissions based on optical multiplexing.

SUMMARY OF THE INVENTION

The invention relates to a system carrying out such bidirectional transmission.

The invention therefore relates to a bidirectional optical amplification system comprising an optical amplifier possessing an input and an output and making it possible to amplify wavelengths lying within a first range of wavelengths, characterized in that it comprises an optical coupling device possessing:

- a first port designed to receive a first optical wave in a second range of wavelengths lying within the first range of wavelengths;
- a second port designed to receive a second optical wave in a third range of wavelengths also lying within the first range of wavelengths;
- an output coupled to the input of the optical amplifier;
- an input coupled to the output of the optical amplifier;

the said device making it possible:

- to direct the first optical wave $(s\lambda_1)$ from the first port to the output of the device;
- to direct the amplified optical wave resulting from the amplification of the first optical wave, from the input of the coupling device to the second port;
- to direct the second optical wave from the second port to the output of the coupling device;
- to direct the amplified optical wave resulting from the amplification of the second optical wave, from the input of the coupling device to the first port.

BRIEF DESCRIPTION OF THE DRAWINGS

The various objects and characteristics of the invention will emerge more clearly in the description which follows and in the appended figures which represent.

DESCRIPTION OF THE PREFERRED EMBODIMENTS

Referring to FIG. 5, a general diagram of the system of the invention will therefore firstly be described.

It is noted firstly that the optical amplifiers having doped fibre exhibit a certain spectral width of optical amplification which makes it possible simultaneously to amplify several co-propagating channels carried by different wavelengths coming into this spectral width and previously multiplexed optically in the same fibre.

Figure 1:
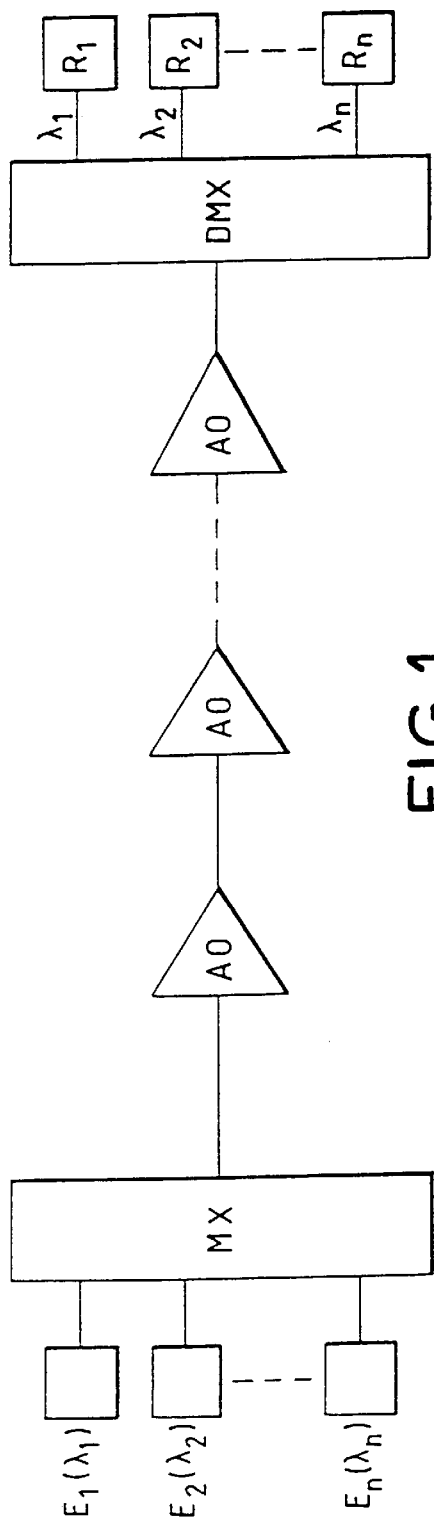
FIGS. 1 to 3, systems known in the art and described previously.
Figure 2:
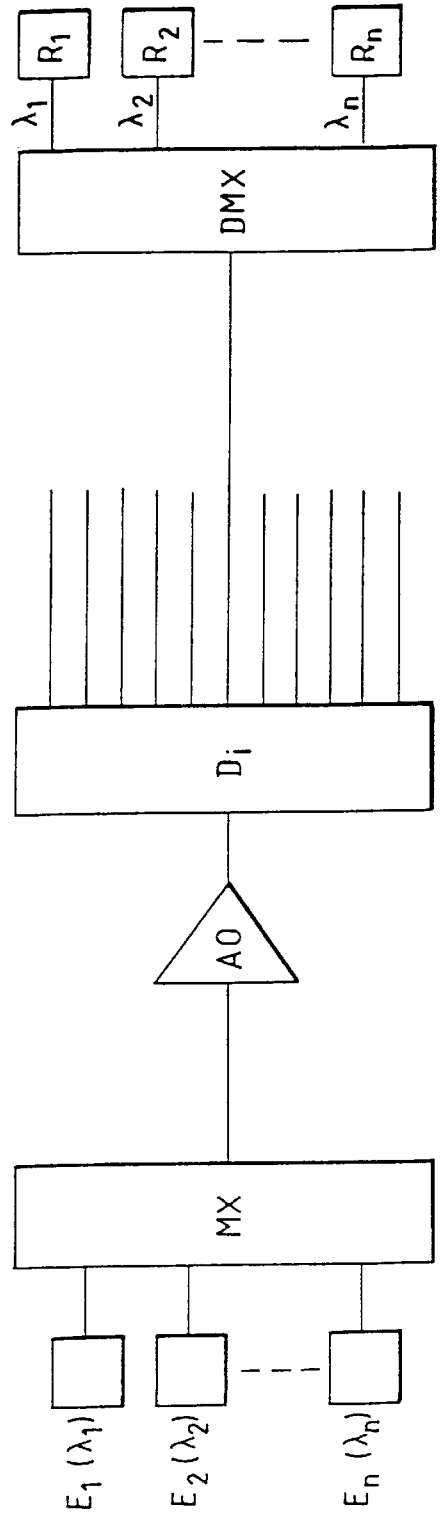
Figure 3:
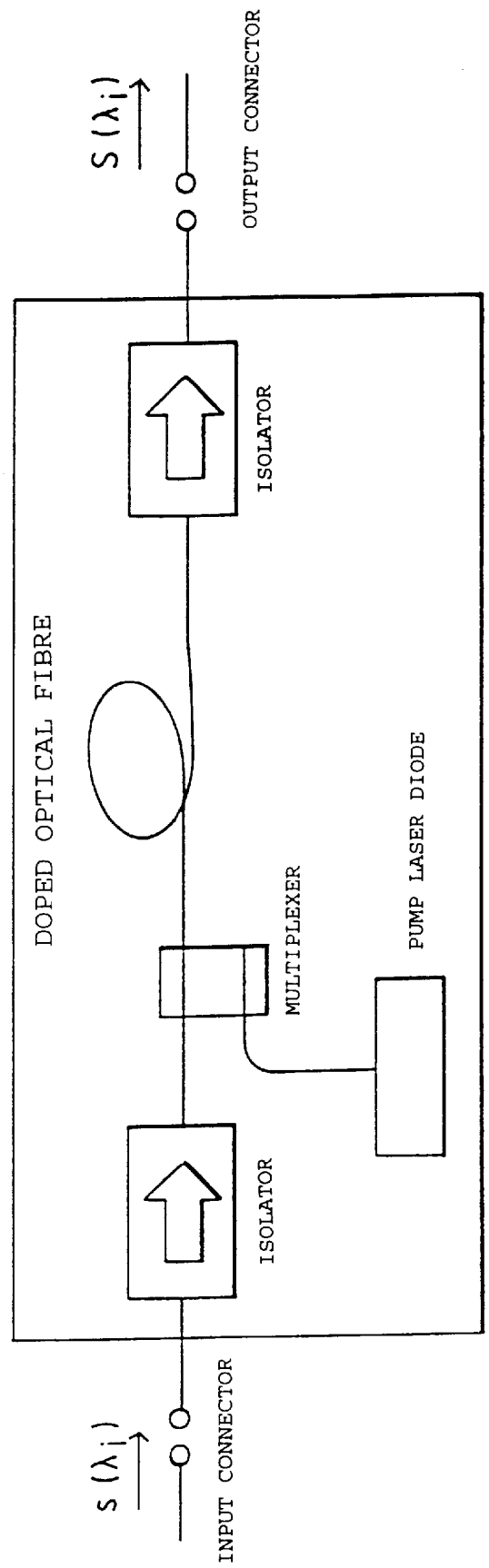
Figure 3:
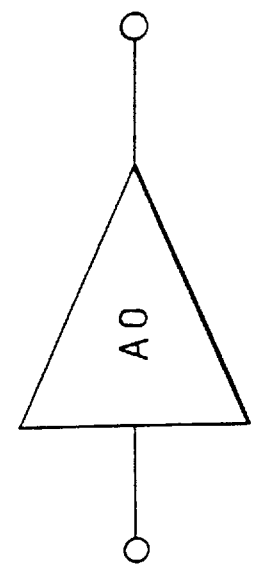
Figure 4:
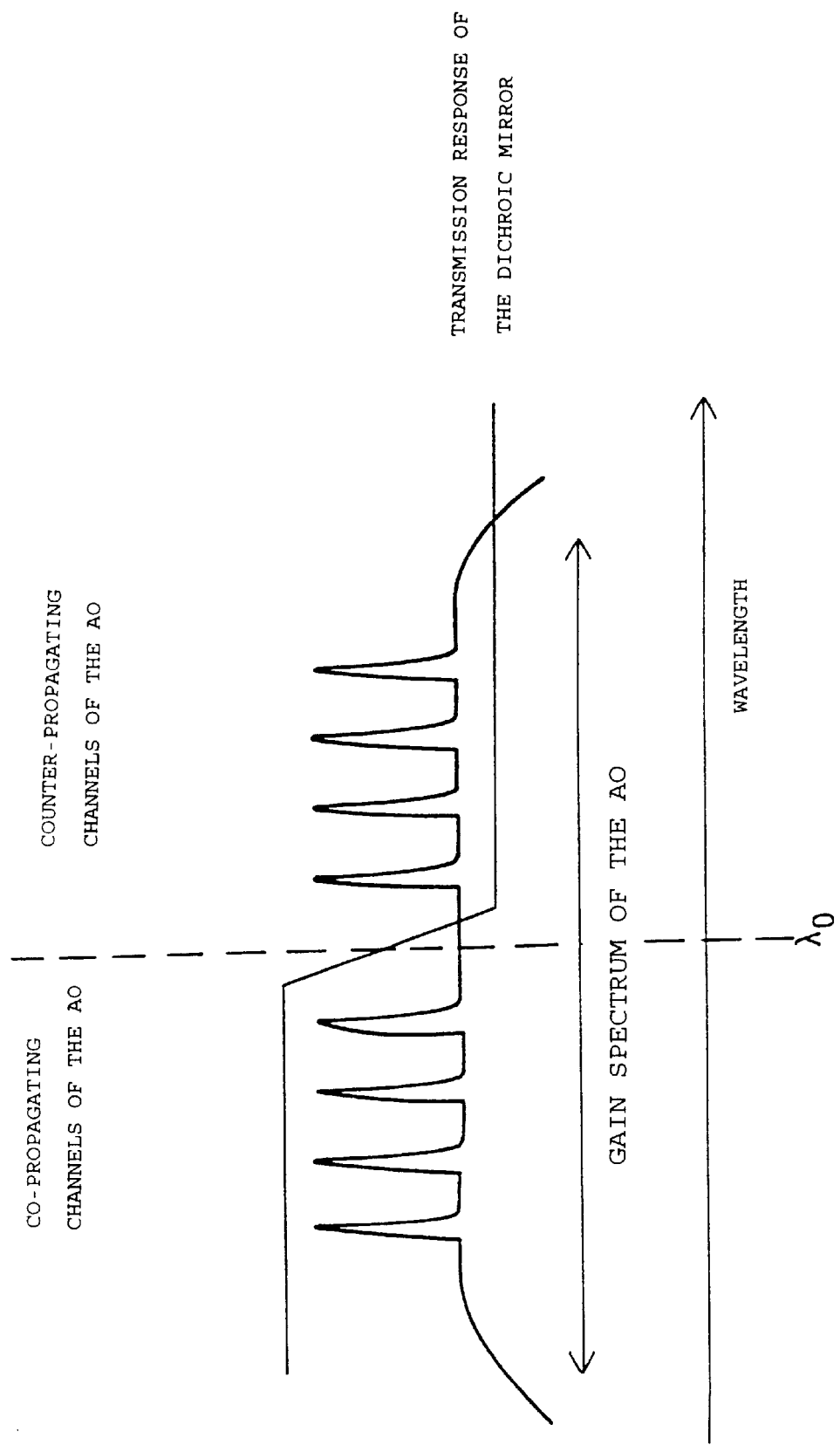
FIG. 4, a wavelength transmission spectrum of the system of the invention.

According to the invention, one part of the spectrum of the amplifier is allocated for transmitting signals propagating in the direction of the optical amplifier and the other part for transmitting counter-propagating signals, as is represented in FIG. 4.

Figure 5A:
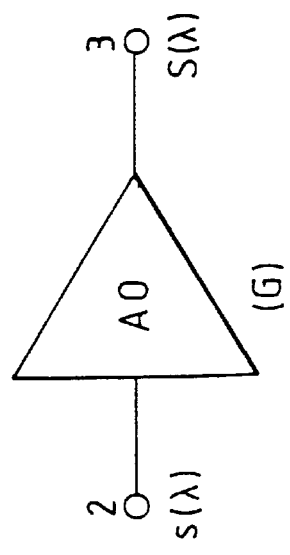
FIGS. 5a and 5b, a general diagram of the system of the invention.
Figure 5B:
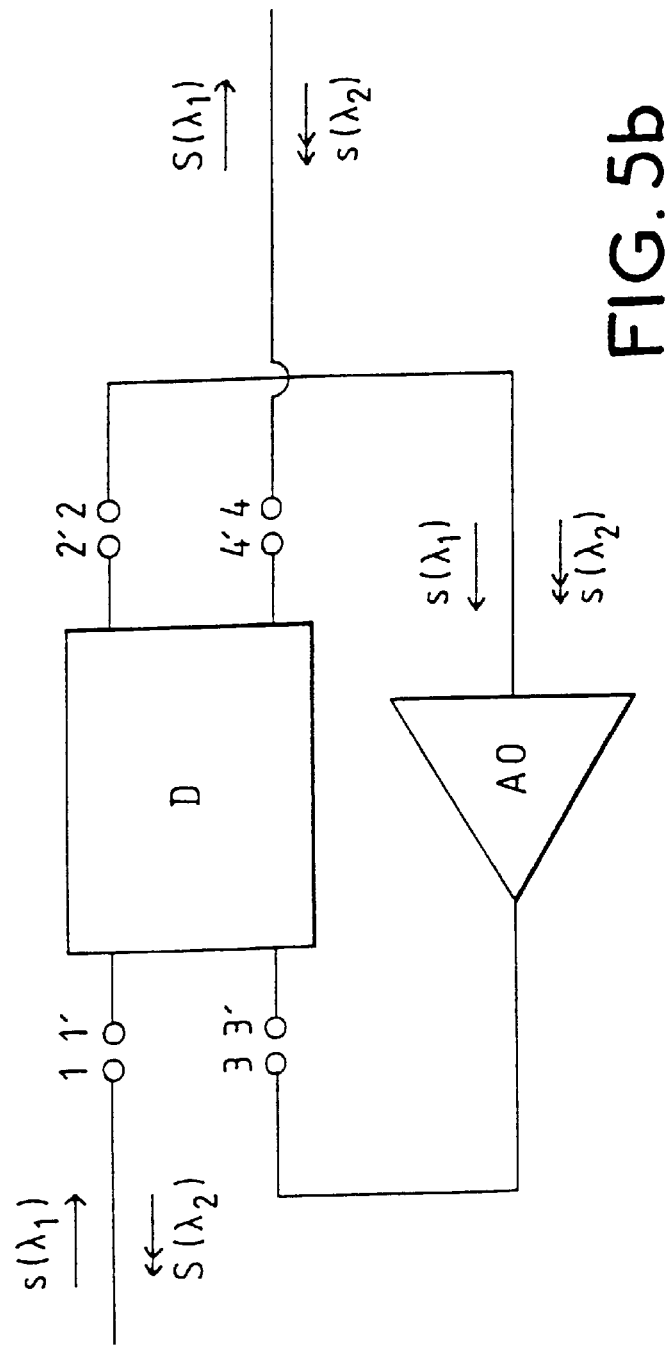

The system of the invention comprises an optical amplifier AO, such as the one of FIG. 5a, which possesses a gain G and which transforms an incoming signal of wavelength $\lambda$, $s(\lambda)$ into an outgoing amplified signal $S(\lambda)$. The amplifier AO possesses an input pigtail optical fibre with end 2 and an output pigtail fibre with end 3.

The system of the invention (FIG. 5b) furthermore possesses a switching device D which possesses four inputs/outputs 1', 2', 3', 4'. The ports 1' and 4' are linked to the exterior transmission circuits (to the transmission fibres in particular).

The ports 2' and 3' are linked respectively to the ports 2 and 3 of the amplifier AO.

The role of D is to:

direct the signal $s(\lambda_1)$ from the port 1 towards the input 2 of the amplifier AO;

direct the amplified signal $S(\lambda_1)$ from the output 3 towards the port 4 of the transmission fibre;

direct a counter-propagating signal, of wavelength $\lambda_2$, $s(\lambda_2)$ from the port 4 towards the input 2 of the amplifier AO;

direct the amplified signal $S(\lambda_2)$ from the output 3 towards the input 1 of the transmission fibre.

The device D therefore makes it possible to use the same monodirectional amplifier AO to amplify 2 counter-propagating signals carried by the wavelengths $\lambda_1$ and $\lambda_2$ respectively.

Allied to this, the device D makes it possible to use the same monodirectional optical amplifier AO to amplify two sets of counter-propagating signals carried by wavelengths situated within the gain spectrum of AO on either side respectively of a wavelength $\lambda_0$ (see FIG. 4).

Figures 6A, 6B:
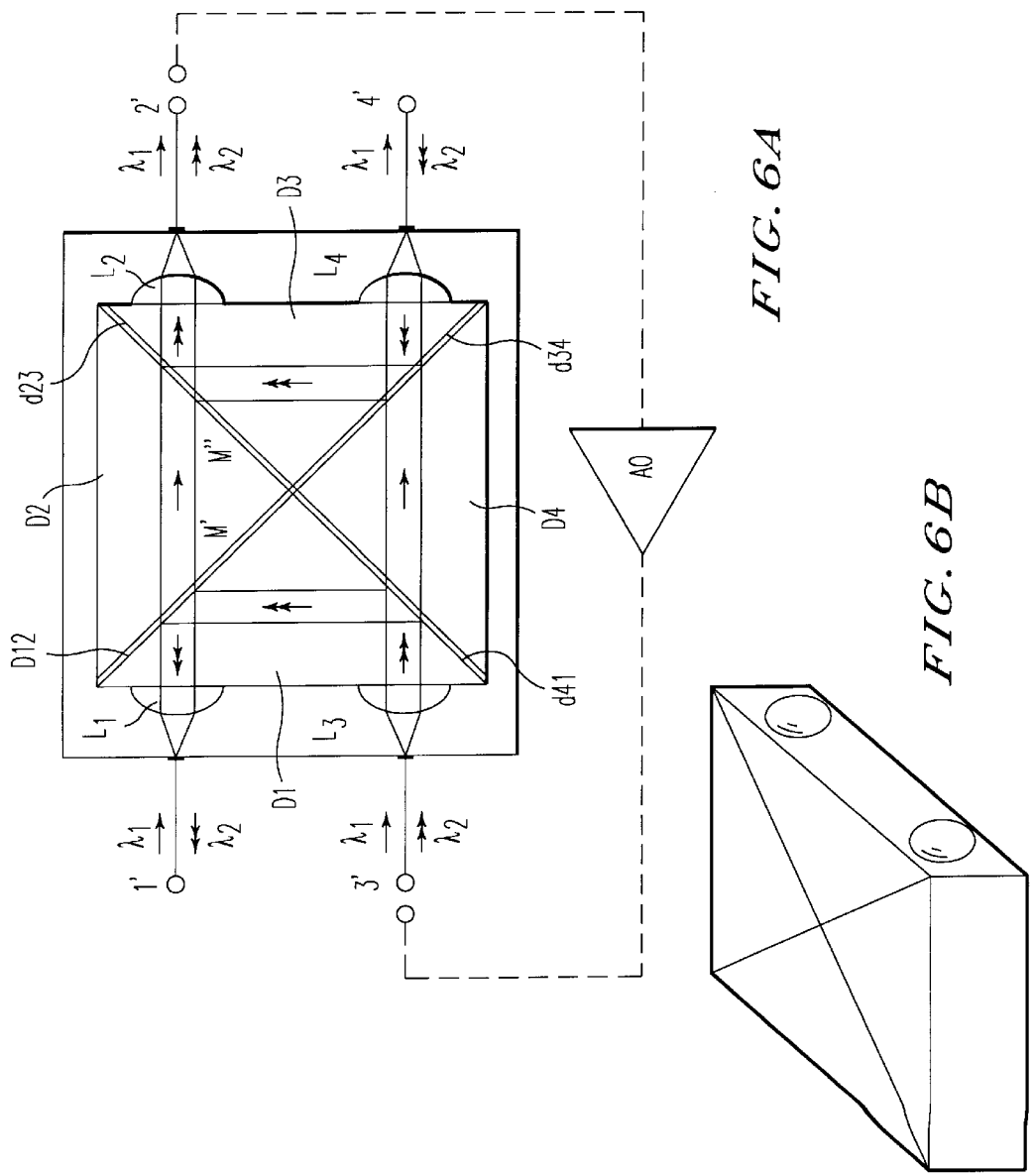
FIGS. 6, 7a and 7b, detailed illustrative embodiments according to the invention.

A first version of the device is represented in FIG. 6. It consists of a transparent right-angled parallelepiped of square section, made by joining together four right-angled parallelepipeds D1, D2, D3, D4 each having a right-angled isosceles triangle as section. The internal faces d12 to d41 are treated so as to constitute dichroic mirrors centred on a wavelength $\lambda_0$ (see FIG. 4).

For example, on such a mirror, any radiation of wavelength less than $\lambda_0$ will be transmitted and any radiation of wavelength greater than $\lambda_0$ will be reflected. Four lenses L1, L2, L3 and L4 are arranged according to FIG. 6 on 2 opposite faces. Their role is to collimate the beams emanating from the ports 1', 2', 3' and 4' or in the reverse direction to focus the collimated beams onto the ports (consisting for example of the cores of optical fibres).

The radiation with the wavelength $\lambda_1$ ($<\lambda_0$) entering the port 1' is collimated by the lens L1, transmitted through the dichroic faces d12 and d23 and focused by the lens L2 into the end fibre of the port 2'.

After amplification by AO, this radiation, propagated by the end fibre 3', is collimated by the lens L3, transmitted by the dichroic faces d41 and d34 and focused by the lens L4 into the end fibre 4'.

The radiation of wavelength $\lambda_2$ ($>\lambda_0$) entering the port 4', is collimated by the lens L4, reflected in succession by the dichroic faces d34 and d23 (placed at 45° with respect to the collimated beam) and focused by the lens L2 into the end fibre 2'.

After amplification by AO, this radiation propagated by the end fibre 3' is collimated by the lens L3, reflected in succession by the dichroic faces d41 and d12 (placed at 45° with respect to the collimated beam) and focused into the end fibre of the port 1'.

The radiations of wavelength $\lambda_1$ and $\lambda_2$ are therefore by design counter-propagating upstream and downstream of the assembly of the device D and of the amplifier AO and co-propagating when passing through the latter.

Figure 7A:
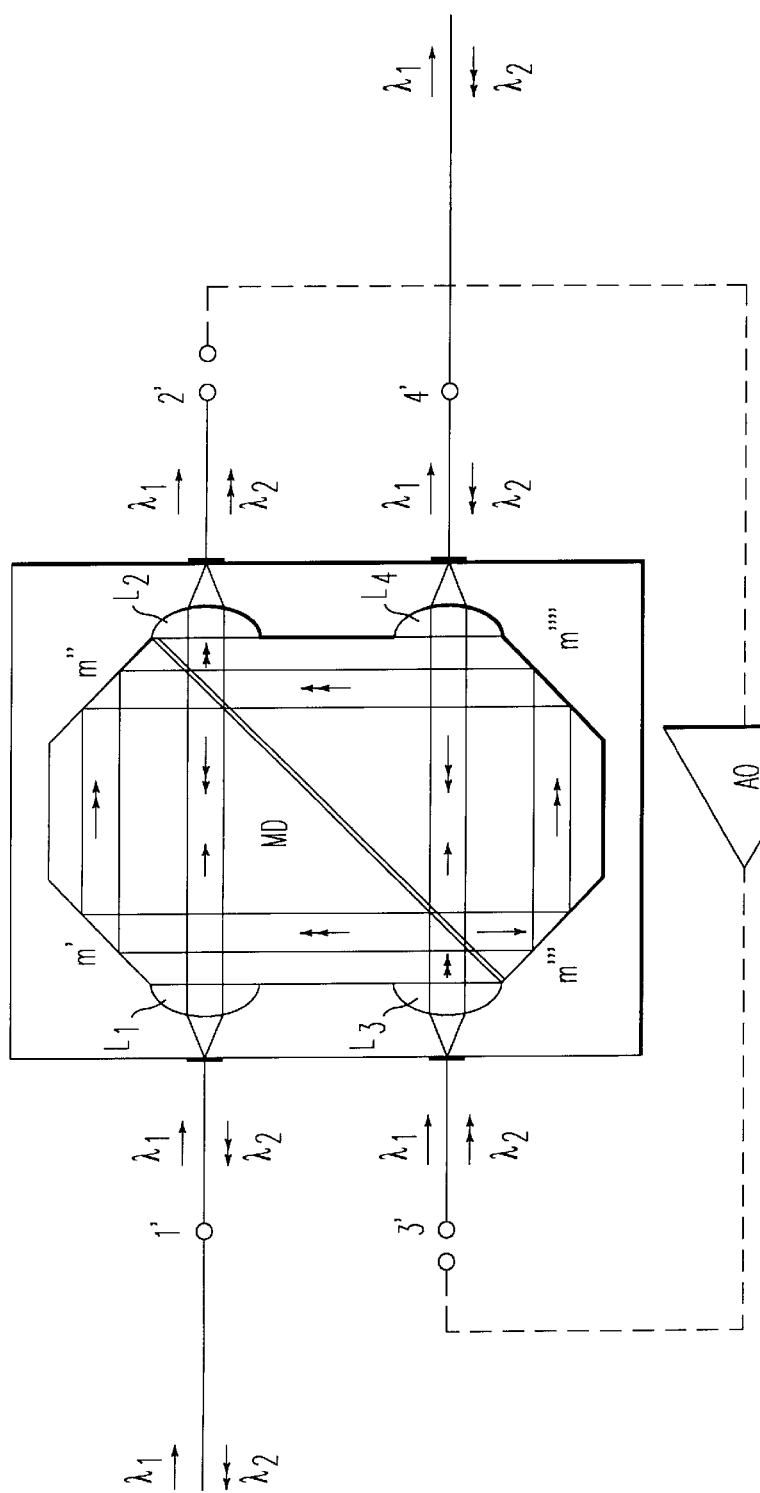
Figure 7B:
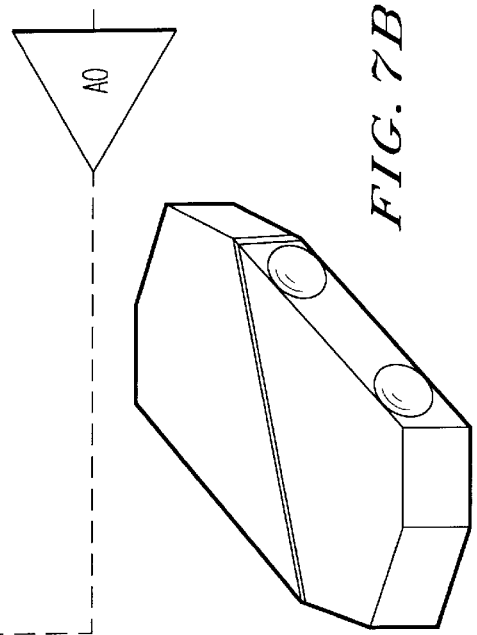

A variant of the device D is represented in FIG. 7. It has the shape of a right-angled parallelepiped of octagonal section consisting of two symmetrical blocks joined together via the dichroic diagonal face MD centred on the wavelength $\lambda_0$. The faces m', m'', m''' and m'''' are reflective. As in the previous case:

The radiation of wavelength $\lambda_1$ ($<\lambda_0$) propagated by the end fibre 1' is collimated by the lens L1, transmitted by the dichroic face MD and focused by the lens L2 into the end fibre of the port 2'.

After amplification by AO, this radiation propagated by the end fibre 3' is collimated by the lens L3, transmitted through the dichroic face MD and is focused by the lens L4 into the end fibre of the port 4';

The radiation of wavelength $\lambda_2$ ($>\lambda_0$) emanating from the end fibre of the port 4' is collimated by the lens L4 reflected in succession off the dichroic face MD, the mirrors m''' and m'''', once again the face MD (all the reflections occur with an angle of 45° in FIG. 7) and focused by the lens L2 into the end fibre of the port 2';

After amplification by AO, this radiation propagated by the end fibre 3' is collimated by the lens L3, reflected in succession by the face of MD, the mirrors m' and m'', once again the face MD and focused by the lens L1 into the end fibre of the port 1'.

As before, the radiations of wavelength $\lambda_1$ and $\lambda_2$ are counter-propagating upstream and downstream of the assembly of the device D and of the amplifier AO and co-propagating when passing through the latter.

The function which transforms a monodirectional optical amplifier into a bidirectional amplifier is performed by a device which:

is a single device is monobloc employs known optical technologies (co-manufacture of the prisms and the dichroic faces, collimation of the beams emanating from optical fibres which is used for making connections).

The proposed device can be simply inserted into existing networks and transmissions and makes it possible to increase their functional capability at low cost. Moreover, it makes it possible to devise new architectures of networks requiring bidirectional transmissions.

What is claimed is:

1. A bidirectional optical amplification system comprising:

an optical amplifier having an input and an output and configured to amplify wavelengths lying within a range of wavelengths; and an optical coupling device including:

a first port configured to receive a first optical wave in a first subrange of wavelengths lying within the range of wavelengths;

a second port configured to receive a second optical wave in a second subrange of wavelengths lying within the range of wavelengths;

an optical coupling output coupled to the input of the optical amplifier;

an optical coupling input coupled to the output of the optical amplifier;

wherein said optical coupling device is configured to direct the first optical wave from the first port to the optical coupling output;

to direct an amplified optical wave, resulting from amplification of the first optical wave, from the optical coupling input to the second port;

to direct the second optical wave from the second port to the optical coupling output; and to direct an amplified optical wave, resulting from amplification of the second optical wave, from the optical coupling input to the first port; and wherein the optical coupling device further comprises four right-angled trihedral prisms joined together via their faces which form a right-angled dihedral angle, and interfaces between the faces reflect waves of the second subrange of wavelengths;

wherein light emitted by the first port in the optical coupling device passes through two interfaces directed along a first path towards the optical coupling output coupled to the input of the optical amplifier;

wherein light emitted by the second port in the optical coupling device is directed along a second path parallel to the first path and is reflected by a first interface and then a second interface so as to be directed along the first path towards the optical coupling output;

wherein the optical coupling output is coupled to the input of the optical amplifier; and wherein the light of the first subrange of wavelengths is transmitted toward the second port, and the light of the second subrange of wavelengths is reflected toward the first port.

2. A bidirectional optical amplification system according to claim 1, wherein the optical coupling device further comprises:

a dichroic mirror reflecting light of the second subrange of wavelengths and not reflecting light of the first subrange of wavelengths, the first port directing the light of the first subrange of wavelengths along a third path towards the optical coupling output while passing through the dichroic mirror and the optical coupling input directing light towards the second port through the dichroic mirror along a fourth path, the second port directing the light of the second subrange of wavelengths towards the dichroic mirror along the fourth path;

a first system of mirrors receiving light originating from the second port after reflection by the dichroic mirror and reflecting light towards the dichroic mirror, the dichroic mirror reflecting light towards the optical coupling output along the third path;

a second system of mirrors receiving light originating from the optical coupling input after reflection by the dichroic mirror and reflecting light towards the dichroic mirror, the dichroic mirror reflecting light towards the first port along the fourth path.

3. A bidirectional amplification system according to claim 2, further comprising a block of transparent material of octagonal shape including two symmetrical blocks joined together by a diagonal face producing the dichroic mirror, the two systems of mirrors comprising faces producing the octagonal shape.

4. A bidirectional optical amplification system comprising:

optical amplifier means having an input and an output and for amplifying wavelengths lying within a range of wavelengths; and optical coupling means including:

first port means for receiving a first optical wave in a first subrange of wavelengths lying within the range of wavelengths;

second port means for receiving a second optical wave in a second subrange of wavelengths lying within the range of wavelengths;

an optical coupling means output coupled to the input of the optical amplifier means;

an optical coupling meas input coupled to the output of the optical amplifiers means;

four light directing prism means joined together via their faces which form a right-angled dihedral angle, and wherein interfaces between the faces reflect waves of the second subrange of wavelengths;

wherein light emitted by the first port means in the optical coupling means passes through two interfaces directed along a first path towards the optical coupling means output coupled to the input of the optical amplifier means;

wherein light emitted by the second port means in the optical coupling means is directed along a second path parallel to the first path and is reflected by a first interface and then a second interface so as to be directed along the first path towards the optical coupling means output;

wherein the optical coupling means output is coupled to the input of the optical amplifier means; and wherein the light of the first subrange of wavelengths is transmitted toward the second port means, and the light of the second subrange of wavelengths is reflected toward the first port means.

5. A bidirectional optical amplification system according to claim 4, wherein the optical coupling means further comprises:

first reflecting means for reflecting light of the second subrange of wavelengths and not reflecting light of the first subrange of wavelengths, the first port means directing the light of the first subrange of wavelengths along a third path towards the optical coupling means output while passing through the first reflecting means and the optical coupling means input directing light towards the second port means through the first reflecting means along a fourth path, the second port means directing the light of the second subrange of wavelengths towards the first reflecting means along the fourth path;

second reflecting means for receiving light originating from the second port means after reflection by the first reflecting means and reflecting light towards the first reflecting means, the first reflecting means reflecting light towards the optical coupling means output along the third path;

third reflecting means for receiving light originating from the optical coupling means input after reflection by the first reflecting means and reflecting light towards the first reflecting means, the first reflecting means reflecting light towards the first port means along the fourth path.

6. A bidirectional amplification system according to claim 5, further comprising two symmetrical block means joined together by a diagonal face producing the first reflecting means, the second and third reflecting means including faces producing the two symmetrical block means.

\* \* \* \* \*